(12) United States Patent
Kim

(10) Patent No.: US 10,884,976 B2
(45) Date of Patent: Jan. 5, 2021

(54) PARALLEL PROCESSING UNIT AND DEVICE FOR PARALLEL PROCESSING

(71) Applicant: MORUMI Co., Ltd., Seongnam-si (KR)

(72) Inventor: Taehyoung Kim, Seongnam-si (KR)

(73) Assignee: MORUMI Co., Ltd., Seongnam-si (KR)

( * ) Notice: Subject to any disclaimer, the term of this patent is extended or adjusted under 35 U.S.C. 154(b) by 251 days.

(21) Appl. No.: 15/986,351

(22) Filed: May 22, 2018

(65) Prior Publication Data

US 2019/0361673 A1    Nov. 28, 2019

(51) Int. Cl.
| | | |
|---|---|---|
| *G06F 15/80* | (2006.01) | |
| *G06F 7/50* | (2006.01) | |
| *G06F 9/38* | (2018.01) | |

(52) U.S. Cl.
CPC ............... *G06F 15/80* (2013.01); *G06F 7/50* (2013.01); *G06F 9/3893* (2013.01)

(58) Field of Classification Search
CPC ....................... G06F 9/34; G06F 9/345; G06F 9/3885–3889; G06F 9/3893; G06F 15/80–8023; G06F 15/8053–8076; G06F 15/8092
See application file for complete search history.

(56) References Cited

U.S. PATENT DOCUMENTS 8,886,696 B1 * 11/2014 Langhammer ........ G06F 7/5324
326/38

9,081,634 B1 * 7/2015 Simkins ..................... G06F 7/57
10,108,376 B1 * 10/2018 Zeng .................. G06F 11/1048
(Continued)

FOREIGN PATENT DOCUMENTS

| JP | 2004-334297 A | 11/2004 |
|---|---|---|
| JP | 2005-322176 A | 11/2005 |

(Continued)

OTHER PUBLICATIONS

Korean Office Action for related KR Application No. 10-2016-0156448 dated Apr. 17, 2018 from Korean Patent Office.
Korean Notice of Allowance for related KR Application No. 10-2016-0156448 dated Sep. 21, 2018 from Korean Patent Office.

*Primary Examiner* — Matthew D Sandifer
(74) *Attorney, Agent, or Firm* — Paratus Law Group, PLLC

(57) ABSTRACT

A parallel processing unit includes a plurality of main processing units and a decision processing unit. Each of the plurality of main processing units includes a main processing calculator for performing a calculation on one or more inputs, a main processing adder for adding an output of the main processing calculator and an output of a decision processing delayer, and a main processing comparator for making a comparison with an output of the main processing adder. The decision processing unit includes a decision processing calculator for adding outputs of the plurality of main processing calculators, a decision processing adder for adding an output of the decision processing calculator and the output of the decision processing delayer, the decision processing delayer for delaying an output of the decision processing adder, and a decision processing comparator for making a comparison with the output of the decision processing adder.

19 Claims, 2 Drawing Sheets

(56) References Cited

U.S. PATENT DOCUMENTS

| | | | | |
|---|---|---|---|---|
| 10,474,390 | B1* | 11/2019 | Whyte | G06F 3/0656 |
| 2005/0144215 | A1* | 6/2005 | Simkins | G06F 7/5443 |
| | | | | 708/620 |
| 2006/0288069 | A1* | 12/2006 | Simkins | G06K 9/00986 |
| | | | | 708/524 |
| 2006/0288070 | A1* | 12/2006 | Vadi | G06K 9/00986 |
| | | | | 708/524 |
| 2016/0049941 | A1* | 2/2016 | How | H03K 19/17748 |
| | | | | 326/9 |

FOREIGN PATENT DOCUMENTS

| | | |
|---|---|---|
| KR | 10-1991-0003490 A | 2/1991 |
| KR | 10-2001-0011683 A | 2/2001 |
| KR | 10-2008-0044102 A | 5/2008 |
| KR | 10-0835173 B1 | 6/2008 |
| KR | 10-2011-0090915 A | 8/2011 |
| KR | 10-2014-0012320 A | 2/2014 |

* cited by examiner

PARALLEL PROCESSING UNIT AND DEVICE FOR PARALLEL PROCESSING

BACKGROUND

1. Field of the Invention

The present disclosure relates to a parallel processing unit and a device for parallel processing.

2. Discussion of Related Art

Most parallel processing devices based in the related art operate in a manner in which a plurality of processors process a plurality of threads. Such a parallel processing device is not suitable for performing a very long sequential calculation in parallel.

As the related art for a parallel processing device for performing a sequential calculation in parallel, there is technology disclosed in Korean Patent No. 10-0835173 (title: Apparatus and Method for Multiply-and-Accumulate Operations in Digital Signal Processing). The disclosed related art is suitable for filtering and performing a Fast Fourier Transform (FFT) and the like, but has aspects unsuitable for performing various operations that may be performed by a central processing unit (CPU).

SUMMARY OF THE INVENTION

The present embodiment is directed to providing a parallel processing unit and a device for parallel processing which may perform in parallel various sequential calculations performed by a central processing unit (CPU).

According to an aspect of the present disclosure, there is provided a parallel processing unit including a plurality of main processing units and a decision processing unit. Each of the plurality of main processing units includes: a main processing calculator configured to perform a calculation on one or more inputs; a main processing adder configured to add an output of the main processing calculator and an output of a decision processing delayer; and a main processing comparator configured to make a comparison with an output of the main processing adder. The decision processing unit includes: a decision processing calculator configured to add outputs of the plurality of main processing calculators belonging to the plurality of main processing units; a decision processing adder configured to add an output of the decision processing calculator and the output of the decision processing delayer; the decision processing delayer configured to delay an output of the decision processing adder; and a decision processing comparator configured to make a comparison with the output of the decision processing adder.

According to another aspect of the present disclosure, there is provided a parallel processing unit including a plurality of main processing units and a decision processing unit. Each of the plurality of main processing units includes: a main processing calculator configured to perform a calculation on one or more inputs; a main processing partial adder configured to select one or more outputs of the plurality of main processing calculators included in the plurality of main processing units and add the selected one or more outputs; a main processing adder configured to add an output of the main processing partial adder and an output of a decision processing delayer; and a main processing comparator configured to make a comparison with an output of the main processing adder. The decision processing unit includes: a decision processing calculator configured to add the outputs of the plurality of main processing calculators belonging to the plurality of main processing units; a decision processing adder configured to add an output of the decision processing calculator and the output of the decision processing delayer; the decision processing delayer configured to delay an output of the decision processing adder; and a decision processing comparator configured to make a comparison with the output of the decision processing adder.

According to another aspect of the present disclosure, there is provided a device for parallel processing, the device including: an address and configuration value generator configured to output a read address group including a plurality of read addresses, a write address group including a plurality of write addresses, and a configuration value group including a plurality of main processing configuration values and a decision processing configuration value; a memory configured to have a plurality of memory banks, output a read data group corresponding to the read address group, and store a write data group according to the write address group; and a parallel processing unit including a plurality of main processing units configured to perform calculations on the read data group and have configurations corresponding to the plurality of main processing configuration values, and a decision processing unit configured to receive outputs of the plurality of main processing units, perform a calculation on the received outputs, and have a configuration corresponding to the decision processing configuration value.

According to another aspect of the present disclosure, there is provided a parallel processing unit including a plurality of main processing units and performing a sequential processing function. Each of the plurality of main processing units includes: a main processing calculator configured to perform a calculation on one or more inputs; a main processing adder configured to add an output of the main processing calculator and an output of a main processing delayer; the main processing delayer configured to delay an output of the main processing adder; and a main processing comparator configured to make a comparison with the output of the main processing adder.

According to another aspect of the present disclosure, there is provided a parallel processing unit including a plurality of main processing units and a decision processing unit. Each of the plurality of main processing units includes: a main processing calculator configured to perform a calculation on one or more inputs; and a main processing partial adder configured to select one or more outputs of the plurality of main processing calculators included in the plurality of main processing units and add the selected one or more outputs.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
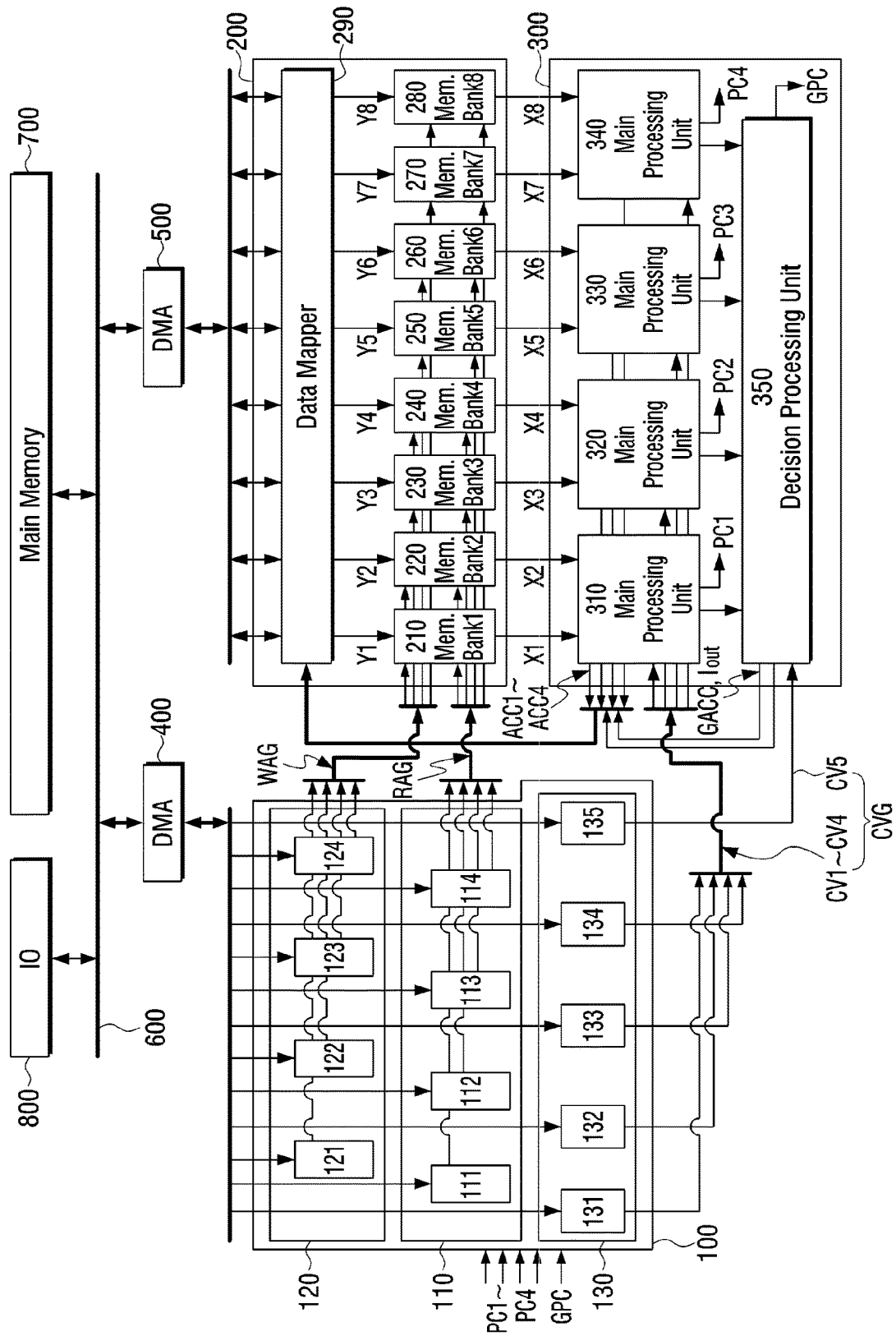
FIG. 1 is a diagram showing a device for parallel processing according to an exemplary embodiment of the present disclosure.

Since the present disclosure may be modified to various forms and include various exemplary embodiments, specific exemplary embodiments will be illustrated in the drawings and described in detail. However, the description is not intended to limit the present disclosure to the specific exemplary embodiments, and it is to be understood that all the changes, equivalents, and substitutions belonging to the spirit and technical scope of the present disclosure are included in the present disclosure.

The terms such as "first," "second," "A," "B," etc. may be used to describe various components, but the components are not limited by the terms. These terms are used only to distinguish one component from another component. For example, a first component may be named a second component, and similarly, the second component may also be named the first component without departing from the scope of the present disclosure. The term "and/or" includes any and all combinations of a plurality of the associated listed items.

A singular expression used herein includes a plural expression unless it has a clearly opposite meaning in the context. It will be appreciated that terms such as "including," "having," etc. are intended to designate the presence of characteristics, numbers, steps, operations, components, parts, or combinations thereof, and do not exclude presence or addition of one or more other characteristics, numbers, steps, operations, components, parts, or a combination thereof.

Prior to describing drawings in detail, the division of configuration units in the present specification is only a division by the main function of each configuration unit. In other words, two or more of the configuration units to be described below may be combined into a single configuration unit, or one configuration unit may be divided into two or more units according to subdivided functions. Each of the configuration units to be described below may additionally perform a part or all of the functions among functions set for other configuration units other than being responsible for the main function, and some main functions taken by each of the configuration units may be exclusively taken and performed by other configuration units.

When a method or an operating method is performed, steps of the method may be performed in a different order from a described order unless a specific order is clearly mentioned in the context. In other words, steps may be performed in the same order as described, performed substantially simultaneously, or performed in reverse order.

FIG. 1 is a diagram showing a device for parallel processing according to an exemplary embodiment of the present disclosure. Referring to FIG. 1, a device for parallel processing includes an address and configuration value generator 100, a memory 200, and a parallel processing unit 300. The device for parallel processing may further include direct memory accesses (DMAs) 400 and 500, a data bus 600, a main memory 700, and an input/output (I/O) device 800.

The address and configuration value generator 100 transfers a read address group RAG and a write address group WAG to the memory 200. The read address group RAG includes a plurality of read addresses, and the write address group WAG includes a plurality of write addresses. Also, the address and configuration value generator 100 transfers a configuration value group CVG to the parallel processing unit 300. The configuration value group CVG includes a plurality of main processing configuration values CV1, CV2, CV3, and CV4 and a decision processing configuration value CV5. The configuration value group CVG may further include configuration values (not shown) for configuring the memory 200 and the DMAs 400 and 500.

The address and configuration value generator 100 includes a read address table 110 for storing a plurality of read address groups RAG. The read address table 110 may include a plurality of banks, for example, four banks 111, 112, 113, and 114. Among the plurality of banks, the first bank 111 stores read addresses which will be transferred to first and second memory banks 210 and 220, the second bank 112 stores read addresses which will be transferred to third and fourth memory banks 230 and 240, the third bank 113 stores read addresses which will be transferred to fifth and sixth memory banks 250 and 260, and the fourth bank 114 stores read addresses which will be transferred to seventh and eighth memory banks 270 and 280.

The address and configuration value generator 100 includes a write address table 120 for storing a plurality of write address groups WAG The write address table 120 may include a plurality of banks, for example, four banks 121, 122, 123, and 124. Among the plurality of banks, the first bank 121 stores write addresses which will be transferred to the first and second memory banks 210 and 220, the second bank 122 stores write addresses which will be transferred to the third and fourth memory banks 230 and 240, the third bank 123 stores write addresses which will be transferred to the fifth and sixth memory banks 250 and 260, and the fourth bank 124 stores write addresses which will be transferred to the seventh and eighth memory banks 270 and 280.

The address and configuration value generator 100 includes a configuration value table 130 for storing a plurality of configuration value groups CVG The configuration value table 130 may include a plurality of banks, for example, five banks 131, 132, 133, 134, and 135. Among the plurality of banks, the first to fourth banks 131, 132, 133, and 134 store the main processing configuration values CV1 to CV4 to be transferred to four main processing units 310, 320, 330, and 340 respectively, and the fifth bank 135 stores the decision processing configuration value CV5 which will be transferred to a decision processing unit 350.

The address and configuration value generator 100 outputs a read address group RAG, a write address group WAG and a configuration value group CVG stored in locations corresponding to a program counter GPC transferred from the decision processing unit 350. When the main processing units 310 to 340 do not perform parallel processing and operate individually, the first banks 111, 121, and 131 output read addresses, write addresses, and the first main processing configuration value CV1 stored at locations corresponding to a first program counter PC1, the second banks 112, 122, and 132 output read addresses, write addresses, and the second main processing configuration value CV2 stored at locations corresponding to a second program counter PC1, the third banks 113, 123, and 133 output read addresses, write addresses, and the third main processing configuration value CV3 stored at locations corresponding to a third program counter PC3, and the fourth banks 114, 124, and 134 output read addresses, write addresses, and the fourth main processing configuration value CV4 stored at locations corresponding to a fourth program counter PC4.

The memory 200 includes a plurality of memory banks, for example, eight memory banks 210, 220, 230, 240, 250, 260, 270, and 280. Each of the first to eighth memory banks 210 to 280 may be, for example, a dual port random access memory (RAM). The memory 200 outputs read data group X1 to X8 corresponding to read address groups RAG. To this end, the first to eighth memory banks 210 to 280 output first to eighth pieces of read data X1 to X8, respectively. Also, the memory 200 stores write data group Y1 to Y8 according to write address group WAG To this end, the first to eighth memory banks 210 to 280 store first to eighth pieces of write data Y1 to Y8, respectively.

The memory 200 may further include a data mapper 290. The data mapper 290 receives data transferred from the DMA 500 and pieces of data ACC1, ACC2, ACC3, ACC4, GACC, and $I_{out}$ transferred from the parallel processing unit 300, and obtains the write data group Y1 to Y8 by aligning the received data with locations of the memory banks 210 to 280 in which the received data will be stored. The data mapper 290 outputs the write data group Y1 to Y8 to the corresponding memory banks 210 to 280. Also, the data mapper 290 transfers data to be stored in the main memory 700 from the memory 200 to the DMA 500.

The parallel processing unit 300 includes the plurality of main processing units, for example, four main processing units 310, 320, 330, and 340 and the decision processing unit 350. The main processing units 310 to 340 perform calculations on the read data group X1 to X8 and have configurations corresponding to the main processing configuration values CV1 to CV4. The decision processing unit 350 receives outputs of the main processing units 310 to 340 to perform a calculation and has a configuration corresponding to the decision processing configuration value CV5. The parallel processing unit 300 outputs the plurality of pieces of data ACC1 to ACC4, GACC, and $I_{out}$.

The decision processing unit 350 outputs the program counter GPC. When the main processing units 310 to 340 do not perform parallel processing and operate individually, comparators 313, 323, 333, and 343 (see FIG. 2) belonging to the main processing units 310 to 340 output the first to fourth program counters PC1 to PC4.

The DMAs 400 and 500 perform data exchange between the data bus 600 and the address and configuration value generator 100 and perform data exchange between the data bus 600 and the memory 200. The data bus 600 provides a data passage between the main memory 700, the I/O device 800, and the DMAs 400 and 500.

Figure 2:
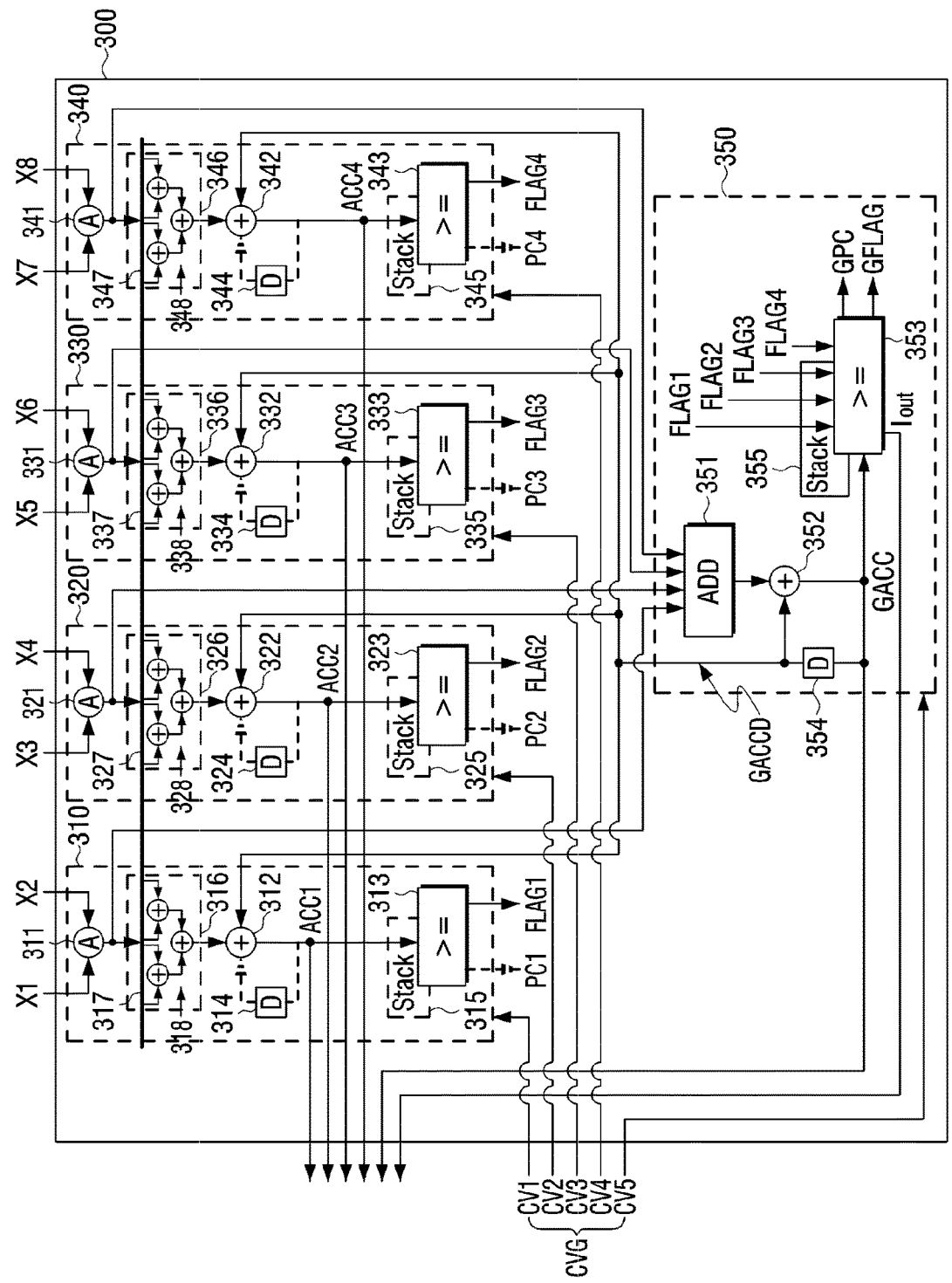
FIG. 2 is a diagram showing an example of a parallel processing unit 300 shown in FIG. 1.

FIG. 2 is a diagram showing an example of the parallel processing unit 300 shown in FIG. 1. Referring to FIG. 2, the parallel processing unit 300 includes the plurality of main processing units, for example, four main processing units 310, 320, 330, and 340 and the decision processing unit 350. The parallel processing unit 300 receives the read data group X1 to X8 and the configuration value group CVG and outputs an output data group ACC1 to ACC4, GACC, and $I_{out}$.

The main processing units 310 to 340 perform calculations on the read data group X1 to X8. Each of the main processing units 310 to 340 includes a main processing calculator 311, 321, 331, or 341, a main processing adder 312, 322, 332, or 342, and the main processing comparator 313, 323, 333, or 343. Each of the main processing units 310 to 340 may further include a main processing partial adder 316, 326, 336, or 346. Each of the main processing units 310 to 340 receives the corresponding main processing configuration value CV1, CV2, CV3, or CV4. Each of the main processing configuration values CV1, CV2, CV3, and CV4 includes a calculation configuration value, a partial addition configuration value, and a main processing comparison configuration value.

Each of the main processing calculators 311, 321, 331, and 341 performs a calculation on one or more pieces of corresponding read data, for example, two pieces of corresponding read data among the plurality of pieces of read data X1 to X8. The first main processing calculator 311 belonging to the first main processing unit 310 performs a calculation on the two pieces of read data X1 and X2, the second main processing calculator 321 belonging to the second main processing unit 320 performs a calculation on the two pieces of read data X3 and X4, the third main processing calculator 331 belonging to the third main processing unit 330 performs a calculation on the two pieces of read data X5 and X6, and the fourth main processing calculator 341 belonging to the fourth main processing unit 340 performs a calculation on the two pieces of read data X7 and X8. Each of the main processing calculators 311, 321, 331, and 341 may perform all required calculations, such as additions, multiplications, shift operations, and pipeline operations. Also, each of the main processing calculators 311, 321, 331, and 341 may perform only some of the calculations. Each of the main processing calculators 311, 321, 331, and 341 performs one of a plurality of performable calculations selected according to the calculation configuration value.

Each of the main processing partial adders 316, 326, 336, and 346 functions to select one or more outputs of the main processing calculators 311, 321, 331, and 341 and add the selected one or more outputs according to the partial addition configuration value. As an example, according to the partial addition configuration value, the first to fourth main processing partial adders 316, 326, 336, and 346 may output outputs of the first to fourth main processing calculators 311, 321, 331, and 341, respectively. As another example, according to the partial addition configuration value, the first to fourth main processing partial adders 316, 326, 336, and 346 may output outputs of the fourth, first, second, and third main processing calculators 341, 311, 321, and 331, respectively. As another example, according to the partial addition configuration value, the first to fourth main processing partial adders 316, 326, 336, and 346 may output the sum of outputs of the second to fourth main processing calculators 321, 331, and 341, the sum of outputs of the first, third and fourth main processing calculators 311, 331, and 341, the sum of outputs of the first, second, and fourth main processing calculators 311, 321, and 341, and the sum of outputs of the first to third main processing calculators 311, 321, and 331, respectively. As another example, according to the partial addition configuration value, the first to fourth main processing partial adders 316, 326, 336, and 346 may output a value obtained by subtracting an output of the second main processing calculator 321 from an output of the first main processing calculator 311, a value obtained by subtracting an output of the third main processing calculator 331 from an output of the second main processing calculator 321, a value obtained by subtracting an output of the fourth main processing calculator 341 from an output of the third main processing calculator 331, and a value obtained by subtracting an output of the first main processing calculator 311 from an output of the fourth main processing calculator 341, respectively.

To this end, each of the main processing partial adders 316, 326, 336, and 346 may include a bus 317, 327, 337, or 347 connected to an output of the main processing calculator 311, 321, 331, or 341, and a selector/adder 318, 328, 338, or 348 connected to the bus 317, 327, 337, or 347 and performing a selection and addition function. The buses 317, 327, 337, and 347 may be connected to each other and integrally formed. When the main processing partial adder 316, 326, 336, or 346 is omitted, an output of the main processing calculator 311, 321, 331, or 341 may be directly transferred to the main processing adder 312, 322, 332, or 342.

Each of the main processing adders 312, 322, 332, and 342 adds an output of the main processing partial adder 316, 326, 336, or 346 and an output GACCD of the decision processing delayer 354. When the main processing units 310, 320, 330, and 340 do not perform parallel processing and operate individually, each of the main processing adders 312, 322, 332, and 342 adds an output of the main processing calculator 311, 321, 331, or 341 and an output of the main processing delayer 314, 324, 334, or 344. The output ACC1, ACC2, ACC3, or ACC4 of the main processing adder 312, 322, 332, or 342 is transferred to the memory 200.

Each of the main processing comparators 313, 323, 333, and 343 compares a main processing comparison configuration value and the output ACC1, ACC2, ACC3, or ACC4 of the main processing adder 312, 322, 332, or 342 and outputs a comparison result FLAG1, FLAG2, FLAG3, or FLAG4. The comparison result FLAG1, FLAG2, FLAG3, or FLAG4 is transferred to a decision processing comparator 353. When the main processing units 310, 320, 330, and 340 do not perform parallel processing and operate individually, the main processing comparators 313, 323, 333, and 343 output the program counters PC1, PC2, PC3, and PC4 to the address and configuration value generator 100.

When the main processing units 310, 320, 330, and 340 do not perform parallel processing and operate individually, each of the main processing units 310, 320, 330, and 340 may further include the main processing delayer 314, 324, 334, or 344 and a main processing stack 315, 325, 335, or 345. Each of the main processing delayers 314, 324, 334, and 344 delays the output ACC1, ACC2, ACC3, or ACC4 of the main processing adder 312, 322, 332, or 342. Each of the main processing stacks 315, 325, 335, and 345 functions to store the program counter PC1, PC2, PC3, or PC4 and the output ACC1, ACC2, ACC3, or ACC4 of the main processing adder 312, 322, 332, or 342.

The decision processing unit 350 receives outputs of the main processing units 310, 320, 330, and 340 and performs a calculation. To this end, the decision processing unit 350 includes a decision processing calculator 351, a decision processing adder 352, the decision processing comparator 353, the decision processing delayer 354, and a decision processing stack 355. The configuration value CV5 corresponding to the decision processing unit 350 is input to the decision processing unit 350. The decision processing configuration value CV5 includes some or all of a decision processing comparison configuration value, an initial counter configuration value, a counter comparison configuration value, a counter increase/decrease configuration value, an offset configuration value, a jump address configuration value, an initial delayer configuration value, and a counter output configuration value.

The decision processing calculator 351 adds outputs of the main processing calculators 311 to 341.

The decision processing adder 352 adds an output GACC of the decision processing calculator 351 and an output GACCD of the decision processing delayer 354. The output GACC of the decision processing adder 352 is transferred to the memory 200.

The decision processing comparator 353 calculates a comparison result GFLAG by comparing the output GACC of the decision processing adder 352 with the decision processing comparison configuration value. According to the comparison result GFLAG the decision processing comparator 353 increases or decreases the program counter value GPC by an offset or changes the program counter value GPC for a jump address value. The offset is determined according to the offset configuration value, and the jump address value is determined according to the jump address configuration value. As an example, when the decision processing comparison configuration value and the offset configuration value are provided and the output GACC of the decision processing adder 352 is less than the decision processing comparison configuration value, the program counter value GPC may be increased or decreased by an offset corresponding to the offset configuration value, and otherwise, the program counter value GPC may be increased by 1 each time. As another example, when the decision processing comparison configuration value and the jump address configuration value are provided and the output GACC of the decision processing adder 352 is less than the decision processing comparison configuration value, the program counter value GPC may be changed for a jump address value corresponding to the jump address configuration value, and otherwise, the program counter value GPC may be increased by 1 each time.

The decision processing comparator 353 calculates a counter value by increasing or decreasing each time an initial counter value determined according to the initial counter configuration value by an interval determined according to the counter increase/decrease configuration value. As an example, when the initial counter value determined according to the initial counter configuration value is 0 and the interval determined according to the counter increase/decrease configuration value is 4, the counter value begins with 0 and is increased by 4 each time.

The decision processing comparator 353 compares the counter value with the counter comparison configuration value. Also, the decision processing comparator 353 calculates an output counter value $I_{out}$ according to the counter value, the comparison results FLAG1 to FLAG4 output from the main processing units 310 to 340, and/or the counter output configuration value and outputs the output counter value $I_{out}$ to the memory 200 as necessary.

The decision processing delayer 354 acquires the output GACCD of the decision processing adder 352 by delaying the output GACC of the decision processing adder 352.

When the initial delayer configuration value is input, the decision processing delayer 354 has an output corresponding to the initial delayer configuration value in the initial stage.

The decision processing stack 355 stores the program counter GPC, the counter value, and the output GACC of the decision processing adder 352.

Operation of the device for parallel processing will be described below with reference to an example. Example 1 is expressed in C language.

Example 1

```
P1 = 0 ;
P2 = 0 ;
P3 = 0 ;
P4 = 1 ;
do {
    CUR = P1 + P2 + P3 + P4 ;
    P4 = P3 ;
    P3 = P2 ;
    P2 = P1 ;
    P1 = CUR ;
} while (CUR < 10) ;
```

When Example 1 is sequentially performed, it may take 10 cycles to execute "do { . . . } while (CUR<10)" once.

Meanwhile, when the device for parallel processing is used, a parallel processing procedure for Example 1 may be expressed as follows.

Parallel Processing Procedure for Example 1

1. The mark // corresponds to an annotation.
2. The mark [ . . . ] denotes a calculation or an initial configuration performed during one cycle.
3. The mark => denotes physical signal connection.
4. All code lines are simultaneously executed.

Accordingly, the parallel processing procedure is given as follows.

```
// parallel processing initialization start
[P1=0; P2=0; P3=0; P4=1] // an initial data memory value
[GACCDinit=0; GACCDcmp=10; OFFSET=0]  //initial values
according to the configuration value group CVG.
    //GACCDinit is a value corresponding to the initial delayer
    configuration value.
    //GACCcmp is a value corresponding to the decision
processing   comparison configuration value.
    DoLoop :
    [
    P1 =>X1 =>ACC1 =>P2prev;
    // P2prev is a value to be stored as a P2 address in the next cycle
    P2 =>X3 =>ACC2 =>P3prev;
    // P3prev is a value to be stored as a P3 address in the next cycle
    P3 =>X5 =>ACC3 =>P4prev;
    // P4prev is a value to be stored as a P4 address in the next cycle
    P3 =>X7 =>ACC4; // P4 value is not stored in the next cycle
    X1+X3+X5+X7 => GACC =>P1prev;
    // P1prev is a value to be stored as a P1 address in the next cycle
    (GACC < 10)? DoLoop : OutLoop ; //Go to DoLoop or OutLoop
    ]
OutLoop: // parallel processing end
```

In the above parallel processing procedure, the mark => generally shows physical signal connections and data flows between the address and configuration value generator 100, the memory 200, and the parallel processing unit 300. In other words, the mark => shows a process of writing data from the memory 200 to the parallel processing unit 300 or from the parallel processing unit 300 to the memory 200 under the control of the address and configuration value generator 100.

In the above parallel processing procedure, "P1=>X1; P2=>X3; P3=>X5; P4=>X7" is performed when the address and configuration value generator 100 transfers the read address group RAG to the memory 200 so that pieces of data corresponding to P1, P2, P3, and P4 are output from the first, third, fifth, and seventh memory banks 210, 230, 250, and 270, respectively.

In the above parallel processing procedure, "X1=>ACC1; X3=>ACC2; X5=>ACC3; X7=>ACC4; X1+X3+X5+X7=>GACC" shows a signal flow in which values input to the main processing units 310, 320, 330, and 340 are output to the main processing adders 312, 322, 332, and 342 and the decision processing adder 352.

In the above parallel processing procedure, "GACC=>P1prev; ACC1=>P2prev; ACC2=> P3prev; ACC3=> P4prev" is performed when the address and configuration value generator 100 transfers the write address group WAG to the memory 200 so that GACC, ACC1, ACC2, and ACC3 corresponding to calculation result values of the parallel processing unit 300 are stored in the first, third, fifth, and seventh memory banks 210, 230, 250, and 270, respectively. In this case, the data mapper 290 is required to provide a data realignment function of changing location paths of GACC, ACC1, ACC2, and ACC3 corresponding to the calculation result values of the parallel processing unit 300 so that GACC, ACC1, ACC2, and ACC3 are stored at the original addresses of P1, P2, P3, and P4, respectively. Here, P1prev, P2preve, P3prev, and P4prev denote values of points to be stored in the next cycle as locations in which P1, P2, P3, and P4 values are originally stored according to the write address group WAG of the address and configuration value generator 100.

The device for parallel processing may select Parallel Processing Procedure 2 in which the data realignment function of the data mapper 290 is not used as follows.

```
DoLoop :
[
    P1 =>X1 =>ACC2 => P2prev;
    // P2prev is a value to be stored as a P2 address in the next cycle
    P2 =>X3 =>ACC3 =>P3prev;
    // P3prev is a value to be stored as a P3 address in the next cycle
    P3 =>X5 =>ACC4 =>P4prev;
    // P4prev is a value to be stored as a P4 address in the next cycle
    X1+X3+X5+X7 => ACC1 =>P1prev;
    // P1prev is a value to be stored as a P1 address in the next cycle
    X1+X3+X5+X7 => GACC;
    (GACC < 10)? DoLoop : OutLoop;  // Go to DoLoop or OutLoop
]
OutLoop:
```

In Parallel Processing Procedure 2, "X1=> ACC2; X3=> ACC3; X5=> ACC4; X1+X3+X5+X7=> ACC1" shows an operation in which the values X1, X3, X5, and X7 input to the main processing units 310, 320, 330, and 340, pass through the main processing calculators 311, 321, 331, and 341, and are selected and added by the main processing partial adders 316, 326, 336, and 346. In other words, the first main processing partial adder 316 selects and adds the outputs X1, X3, X5, and X7 of the first to fourth main processing calculators 311, 321, 331, and 341 and outputs the sum, the second main processing partial adder 326 selects and outputs the output X1 of the first main processing calculator 311, the third main processing partial adder 336 selects and outputs the output X3 of the second main processing calculator 321, and the fourth main processing partial adder 346 selects and outputs the output X5 of the third main processing calculators 331. According to the partial addition configuration value, it is determined which of the outputs of the main processing calculators 311, 321, 331, and 341 will be selected and added by the main processing partial adders 316, 326, 336, and 346.

"(GACC<10)? DoLoop: OutLoop;" is performed by the decision processing comparator 353. When GACC is less than 10, the procedure branches to a DoLoop address, and when GACC is greater than or equal to 10, the procedure branches to an OutLoop address.

To operate in this way, the decision processing comparator 353 compares the output GACC of the decision processing adder 352 and the decision processing comparison configuration value (GACCcmp of the parallel processing procedure for Example 1), increases or decreases the program counter GPC by the offset configuration value (OFFSET of the parallel processing procedure for Example 1) when the output GACC of the decision processing adder 352 is less than GACCcmp, and otherwise increases the program counter GPC by 1.

As described above, it takes 10 cycles to sequentially execute "do { . . . } while (CUR<10)" once according to related art, whereas it may take only 1 cycle to execute "do { . . . } while (CUR<10)" in parallel according to the present embodiment.

In addition, operation of the device for parallel processing will be described below with reference to an example. Example 2 is expressed in the C language as follows.

Example 2

```
Ex2( ) {
    for (i=0; i<=10000; i++) {
        o+= a[i]*b[i];
        if(o>=5000) {
            return i;
        }
    }
}
```

Assuming that Example 2 is sequentially executed, it takes about five cycles to execute "{o+=a[i]*b[i]; if(o>=5000) {return i;}}" once. When Example 2 is executed by using the device for parallel processing, a parallel processing procedure for Example 2 may be expressed as follows.

Parallel Processing Procedure for Example 2

1. The mark // corresponds to an annotation.
2. The mark [ . . . ] denotes a calculation or an initial configuration performed during one cycle.
3. The mark => denotes physical signal connection.
4. All code lines are simultaneously executed (excluding if statements).

Accordingly, the parallel processing procedure is given as follows.

```
// initial data memory values
.... .... .... .... .... .... ....
Address = x+16 : [ a[8], b[8], a[9], b[9], a[10], b[10], a[11], b[11] ]
Address = x+8 : [ a[4], b[4], a[5], b[5], a[6], b[6], a[7], b[7] ]
Address = x+0 : [ a[0], b[0], a[1], b[1], a[2], b[2], a[3], b[3] ]
// when an interruption occurs, the following values are stored in the decision processing stack 355.
[ GPC => GPCstack ; I => Istack ; GACC => GACCstack ]
// an initial value configuration according to the configuration value table
[GACCDinit=0; GACCcmp=5000; OFFSET=x; {Iinit=0; Istep=4; Icmp=10000};
JumpAddress = GPCstack]
// GACCDinit is a value corresponding to the initial delayer configuration value.
// GACCcmp is a value corresponding to the decision processing comparison configuration value.
// Istep is a value corresponding to the counter increase/decrease configuration value.
// Icmp is a value corresponding to the counter comparison configuration value.
// JumpAddress is a value corresponding to the jump address configuration value.
// a routine disclosed by a valid combination of individual FLAGs (FLAG1/FLAG2/FLAG3/FLAG4).
// during the execution process of the following code is a routine automatically processed by hardware.
// parallel processing start
Doloop:
[
    a[i] => X1;
    a[i+1] => X3;
    a[i+2] => X5;
    a[i+3] => X7;
    b[i] => X2;
    b[i+1] => X4;
    b[i+2] => X6;
    b[i+3] => X8;
    X1*X2 + GACCD => ACC1;
    X1*X2 + X3*X4 + GACCD => ACC2;
    X1*X2 + X3*X4 + X5*X6 + GACCD => ACC3;
    X1*X2 + X3*X4 + X5*X6 + X7*X8 + GACCD => ACC4;
    X1*X2 + X3*X4 + X5*X6 + X7*X8 + GACCD => GACC;
    if (FLAG1) { // if (ACC1 >= 5000) // performed by hardware
        I=I+0; o=ACC1; return I; //branches to the jump address.
        //I is output as $I_{out}$. $I_{out}$ corresponds to i.
    } else if (FLAG2) { // if (ACC2 >= 5000 ) // performed by hardware.
        I=I+1; o=ACC2; return I;
        // branches to the jump address. I is output as $I_{out}$.
    } else if (FLAG3) { // if (ACC3 >= 5000) ) // performed by hardware
        I=I+2; o=ACC3; return I;
        // branches to the jump address. I is output as $I_{out}$.
    } else if (FLAG4) { // if (ACC4 >= 5000) ) // performed by hardware.
        I=I+3; o=ACC4; return I;
        // branches to the jump address. I is output as $I_{out}$.
    } else {
        I = I + Istep; // Istep=4, initialized and automatically increased or decreased by the configuration value group CVG.
    }
    (I <= Icmp):? Go to DoLoop : OutLoop ; // repeat or go out of the loop
]
OutLoop:        // parallel processing end
```

Physical signal connections and signal flows made in the parallel processing procedure for Example 2 are as follows.

In the above parallel processing procedure, "a[i]=> X1; a[i+1]=> X3; a[i+2]=> X5; a[i+3]=> X7;" is executed when the address and configuration value generator 100 transfers the read address group RAG to the memory 200 so that pieces of data corresponding to a[i], a[i+1], a[i+2], and a[i+3] are output from the first, third, fifth, and seventh memory banks 210, 230, 250, and 270, respectively.

Also, "b[i]=> X2; b[i+1]=> X4; b[i+2]=> X6; b[i+3]=> X8;" is executed when the address and configuration value generator 100 transfers the read address group RAG to the memory 200 so that pieces of data corresponding to b[i], b[i+1], b[i+2], and b[i+3] are output from the second, fourth, sixth, and eighth memory banks 220, 240, 260, and 280, respectively.

In the above parallel processing procedure, the following code shows signal flows in which values of the read data group X1 to X8 input to the main processing units 310, 320, 330, and 340 are subjected to a calculation process, added to an output of the decision processing delayer 354, and output to the main processing adders 312, 322, 332, and 342 and the decision processing adder 352.

```
[
    Line 1: X1*X2 + GACCD => ACC1;
    Line 2: X1*X2 + X3*X4 + GACCD => ACC2;
    Line 3: X1*X2 + X3*X4 + X5*X6 + GACCD => ACC3;
``` the output of the first main processing calculator 311, the second main processing partial adder 326 selects and adds the outputs of the first and second main processing calculators 311 and 321 and outputs the sum, the third main processing partial adder 336 selects and adds the outputs of the first to third main processing calculators 311, 321, and 331 and outputs the sum, and the fourth main processing partial adder 346 selects and adds the outputs of the first to fourth main processing calculators 311, 321, 331, and 341 and outputs the sum. The main processing adders 312, 322, 332, and 342 add the outputs of the partial adders 316, 326, 336, and 346 and the output GACCD of the decision processing delayer 354. Therefore the main processing adders 312, 322, 332, and 342 output X1*X2+ GACCD as ACC1, X1*X2+X3*X4+ GACCD as ACC2, X1*X2+X3*X4+X5*X6+ GACCD as ACC3, and X1*X2+X3*X4+X5*X6+X7*X8+ GACCD as ACC4, respectively.

In the above parallel processing procedure, Line 5 shows a signal flow in which the values of the read data group X1 to X8 are subjected to a calculation process, added to the output of the decision processing delayer 354, and output to the decision processing adder 352.

In the above parallel processing procedure, the following code denotes parallel processing performed by the main processing comparators 313, 323, 333, and 343 and the decision processing comparator 353. An operation disclosed by a valid combination of individual FLAGs (FLAG1/FLAG2/FLAG3/FLAG4) during an execution process of the following code is automatically processed by hardware.

```
[
    if (FLAG1) { // if (ACC1 >= 5000) // performed by hardware
        I=I+0; o= ACC1; return I;
        // branches to the jump address. I is output as I_out. I_out corresponds to i.
    } else if (FLAG2) { // if (ACC2 >= 5000) // performed by hardware
        I=I+1; o=ACC2; return I;
        // branches to the jump address. I is output as I_out.
    } else if (FLAG3) { // if (ACC3 >= 5000) // performed by hardware
        I=I+2; o=ACC3; return I;
        // branches to the jump address. I is output as I_out.
    } else if (FLAG4) { // if (ACC4 >= 5000) ) // performed by hardware
        I=I+3; o=ACC4; return I;
        // branches to the jump address. I is output as I_out.
    } else {
        I = I + Istep; // Istep=4, initialized and automatically increased or decreased
            according to a configuration of the configuration table.
    }
]
```

-continued
```
    Line 4: X1*X2 + X3*X4 + X5*X6 + X7*X8 + GACCD => ACC4;
    Line 5: X1*X2 + X3*X4 + X5*X6 + X7*X8 + GACCD => GACC;
]
```

In the Line 1, Line 2, Line 3 and Line 4 of above parallel processing procedure, the memory 200 outputs the values of the read data group X1 to X8 to the main processing calculators 311, 321, 331, and 341, and the main processing calculators 311, 321, 331, and 341 output values corresponding to X1*X2, X3*X4, X5*X6, and X7*X8 to the main processing partial adders 316, 326, 336, and 346, respectively. The main processing partial adders 316, 326, 336, and 346 select and add the outputs of the main processing calculators 311, 321, 331, and 341 and output values corresponding to X1*X2, X1*X2+X3*X4, X1*X2+X3*X4+X5*X6, X1*X2+X3*X4+X5*X6+X7*X8. To this end, the first main processing partial adder 316 selects and outputs In the above parallel processing procedure, "(I<=Icmp)? Go to DoLoop: OutLoop" is executed by the decision processing comparator 353 belonging to the decision processing unit 350. When a counter value I is less than or equal to the counter comparison configuration value Icmp, the procedure branches to the DoLoop address, and when the counter value I is greater than the counter comparison configuration value Icmp, the procedure branches to the OutLoop address.

"(I<=Icmp)? Go to DoLoop: OutLoop;" is executed by the decision processing comparator 353 belonging to the decision processing unit 350. The decision processing comparator 353 compares the counter value I and the counter comparison configuration value Icmp (Icmp=10000 of the parallel processing procedure for Example 2), increases or decreases the program counter GPC by the offset configuration value (OFFSET of the parallel processing procedure for Example 2) when the counter value I is greater than the counter comparison configuration value Icmp, and otherwise increases the program counter GPC by 1.

As described above, it takes about 20 cycles to sequentially execute "{o+=a[i]*b[i]; if(o>=5000) {return i;}}" four times according to related art, whereas it takes only 1 cycle to execute "{o+=a[i]*b[i]; if(o>=5000) {return i;}}" in parallel according to the present embodiment.

Since a parallel processing unit and a device for parallel processing according to exemplary embodiments of the present disclosure can perform various sequential calculations which can be performed by a CPU in parallel, it is possible to improve calculation speed and efficiency.

Although exemplary embodiments of the present disclosure have been described in detail above with reference to the accompanying drawings, the present disclosure is not limited to these embodiments and may be practiced in a variety of modified ways without departing from the technical spirit of the present disclosure. Therefore, the embodiments disclosed in the present disclosure are intended not to limit but to describe the technical scope of the present disclosure, and the scope of the technical spirit of the present disclosure is not limited by the embodiments.

The embodiments set forth herein should be construed as exemplary and not limiting. The scope of the present disclosure is disclosed in the following claims, and all technical spirits within the range of their equivalents shall be construed as being included in the scope of the present disclosure.

What is claimed is:

1. A parallel processing unit including a plurality of main processing units and a decision processing unit,
wherein each of the plurality of main processing units comprises: a main processing calculator configured to perform a calculation on one or more inputs; a main processing adder configured to add an output of the main processing calculator and an output of a decision processing delayer; and a main processing comparator configured to make a comparison with an output of the main processing adder, and
wherein the decision processing unit comprises: a decision processing calculator configured to add outputs of the plurality of main processing calculators belonging to the plurality of main processing units; a decision processing adder configured to add an output of the decision processing calculator and the output of the decision processing delayer; the decision processing delayer configured to delay an output of the decision processing adder; and a decision processing comparator configured to make a comparison with the output of the decision processing adder.

2. The parallel processing unit of claim 1, wherein the main processing comparator outputs a main processing flag corresponding to a result of comparing a main processing comparison configuration value with the output of the main processing adder.

3. The parallel processing unit of claim 2, wherein the decision processing comparator calculates a counter value by increasing or decreasing an initial counter value which is determined according to initial counter configuration value, by an interval which is determined according to a counter increase/decrease configuration value, each time.

4. The parallel processing unit of claim 3, wherein the decision processing comparator outputs an output counter value determined according to the counter value, the plurality of main processing flags output from the plurality of main processing units, and a counter comparison configuration value.

5. The parallel processing unit of claim 1, wherein the decision processing comparator calculates a decision processing flag corresponding to a result of comparing a decision processing comparison configuration value with the output of the decision processing adder.

6. The parallel processing unit of claim 5, wherein the decision processing comparator increases or decreases a value of a program counter by an offset according to the decision processing flag, and
the offset is determined according to an offset configuration value.

7. The parallel processing unit of claim 5, wherein the decision processing comparator changes a value of a program counter to a jump address value according to the decision processing flag, and
the jump address value is determined according to a jump address configuration value.

8. The parallel processing unit of claim 1, wherein each of the main processing units further comprises a main processing delayer configured to delay the output of the main processing adder, and
when the plurality of main processing units operate individually, the main processing adder adds the output of the main processing calculator and an output of the main processing delayer, and outputs a result of the addition to the main processing comparator.

9. A parallel processing unit including a plurality of main processing units and a decision processing unit,
wherein each of the plurality of main processing units comprises: a main processing calculator configured to perform a calculation on one or more inputs; a main processing partial adder configured to select one or more outputs of the plurality of main processing calculators included in the plurality of main processing units and add the selected one or more outputs; a main processing adder configured to add an output of the main processing partial adder and an output of a decision processing delayer; and a main processing comparator configured to make a comparison with an output of the main processing adder, and
wherein the decision processing unit comprises: a decision processing calculator configured to add the outputs of the plurality of main processing calculators belonging to the plurality of main processing units; a decision processing adder configured to add an output of the decision processing calculator and the output of the decision processing delayer; the decision processing delayer configured to delay an output of the decision processing adder; and a decision processing comparator configured to make a comparison with the output of the decision processing adder.

10. A device for parallel processing, the device comprising:
an address and configuration value generator configured to output a read address group including a plurality of read addresses, a write address group including a plurality of write addresses, and a configuration value group including a plurality of main processing configuration values and a decision processing configuration value;
a memory configured to have a plurality of memory banks, output a read data group corresponding to the read address group, and store a write data group according to the write address group; and
a parallel processing unit including a plurality of main processing units configured to perform calculations on the read data group and have configurations corresponding to the plurality of main processing configuration values, and a decision processing unit configured to receive outputs of the plurality of main processing units, perform a calculation on the received outputs, and have a configuration corresponding to the decision processing configuration value.

11. The device of claim 10, wherein the read data group includes a plurality of pieces of read data,
wherein each of the plurality of main processing units comprises: a main processing calculator configured to perform a calculation on one or more corresponding pieces of read data among the plurality of pieces of read data; a main processing adder configured to add an output of the main processing calculator and an output of a decision processing delayer; and a main processing comparator configured to make a comparison with an output of the main processing adder,
wherein the decision processing unit comprises: a decision processing calculator configured to add the outputs of the plurality of main processing calculators belonging to the plurality of main processing units; a decision processing adder configured to add an output of the decision processing calculator and the output of the decision processing delayer; the decision processing delayer configured to delay an output of the decision processing adder; and a decision processing comparator configured to make a comparison with the output of the decision processing adder, and
wherein the write data group includes the outputs of the plurality of main processing adders belonging to the plurality of main processing units and the output of the decision processing adder.

12. The device of claim 10, wherein the read data group includes a plurality of pieces of read data,
wherein each of the plurality of main processing units comprises: a main processing calculator configured to perform a calculation on one or more corresponding pieces of read data among the plurality of pieces of read data; a main processing partial adder configured to select one or more outputs of the plurality of main processing calculators included in the plurality of main processing units and add the selected one or more outputs; a main processing adder configured to add an output of the main processing partial adder and an output of a decision processing delayer; and a main processing comparator configured to make a comparison with an output of the main processing adder,
wherein the decision processing unit comprises: a decision processing calculator configured to add the outputs of the plurality of main processing calculators belonging to the plurality of main processing units; a decision processing adder configured to add an output of the decision processing calculator and the output of the decision processing delayer; the decision processing delayer configured to delay an output of the decision processing adder; and a decision processing comparator configured to make a comparison with the output of the decision processing adder, and
wherein the write data group includes the outputs of the plurality of main processing adders belonging to the plurality of main processing units and the output of the decision processing adder.

13. The device of claim 12, wherein each of the plurality of main processing configuration values includes a main processing comparison configuration value, and
the main processing comparators output main processing flags corresponding to results of comparing the main processing comparison configuration values with the outputs of the main processing adders.

14. The device of claim 13, wherein the decision processing configuration value includes a decision processing comparison configuration value, and
the decision processing comparator calculates a decision processing flag corresponding to a result of comparing the decision processing comparison configuration value with the output of the decision processing adder.

15. The device of claim 14, wherein the decision processing configuration value further includes an offset configuration value, and
the decision processing comparator increases or decreases a program counter value by an offset which is determined according to the offset configuration value, according to the decision processing flag.

16. The device of claim 14, wherein the decision processing configuration value further includes a jump address configuration value, and
the decision processing comparator changes a program counter value for a jump address value which is determined according to the jump address configuration value, according to the decision processing flag.

17. The device of claim 13, wherein the decision processing configuration value includes an initial counter configuration value and a counter increase/decrease configuration value, and
the decision processing comparator calculates a counter value by increasing or decreasing an initial counter value which is determined according to the initial counter configuration value, each time by an interval determined according to the counter increase/decrease configuration value.

18. The device of claim 17, wherein the decision processing configuration value further includes a counter comparison configuration value, and
wherein the decision processing comparator outputs an output counter value determined according to the counter value, the plurality of main processing flags output from the plurality of main processing units, and the counter comparison configuration value, and
wherein the write data group further includes the output counter value.

19. The device of claim 12, wherein each of the plurality of main processing units further comprises a main processing delayer configured to delay the output of the main processing adder, and
when the plurality of main processing units operate individually, the main processing adder adds the output of the main processing calculator and an output of the main processing delayer and outputs a result of the addition to the main processing comparator.

* * * * *